US005745476A

United States Patent [19]
Chaudhuri

[11] Patent Number: 5,745,476
[45] Date of Patent: Apr. 28, 1998

[54] ERRORLESS SWITCHING TECHNIQUES IN RING NETWORK

[75] Inventor: Sid Chaudhuri, East Brunswick, N.J.

[73] Assignee: AT&T Corp., Middletown, N.J.

[21] Appl. No.: 682,064

[22] Filed: Jul. 16, 1996

[51] Int. Cl.[6] .................................................. H04J 1/16
[52] U.S. Cl. ............................................. 370/222; 370/508
[58] Field of Search .................................... 370/216, 222,
370/223, 224, 225, 241, 242, 245, 249,
248, 403, 404, 405, 406, 503, 508, 509,
517; 375/355, 356; 340/355, 356, 825.01,
825.02, 825.05, 827

[56] References Cited

U.S. PATENT DOCUMENTS 5,442,620  8/1995  Kremes ..................................... 370/224
5,469,428  11/1995  Tokuia et al. ............................ 370/224
5,623,482  4/1997  Okanoue .................................. 370/224

*Primary Examiner*—Dang Ton
*Attorney, Agent, or Firm*—Henry T. Brendzel

[57]  ABSTRACT

A method of performing errorless switching in a ring network having one or more rings and a plurality of transmitting routes. The transmission delays or lengths of at least predetermined sections of the routes are compared, and the comparison is used to determine the value of a first delay added to one of the routes. Another delay is added to enable phase alignment of signals so that errorless switching can be achieved. The delays are then adjusted to reduce cumulative delays which could degrade the quality of data transmission.

16 Claims, 14 Drawing Sheets

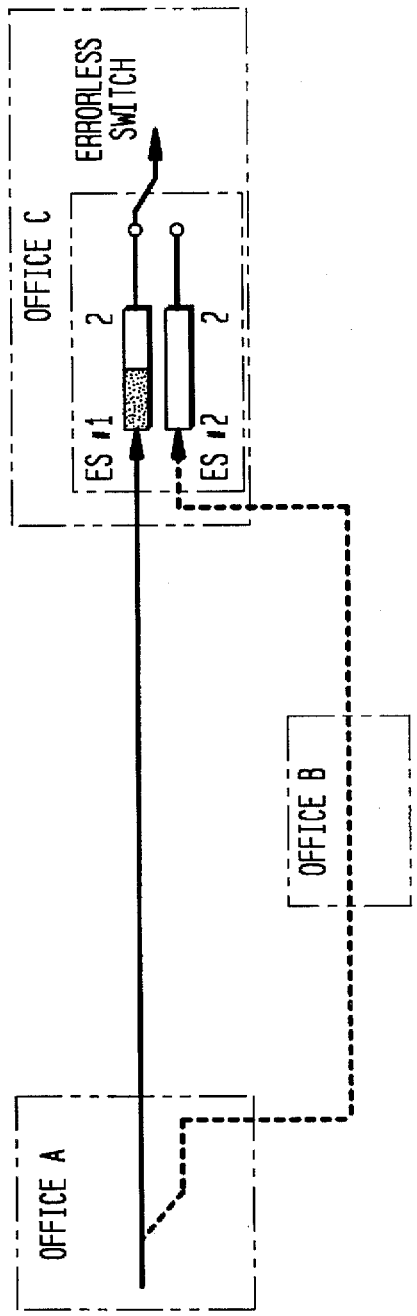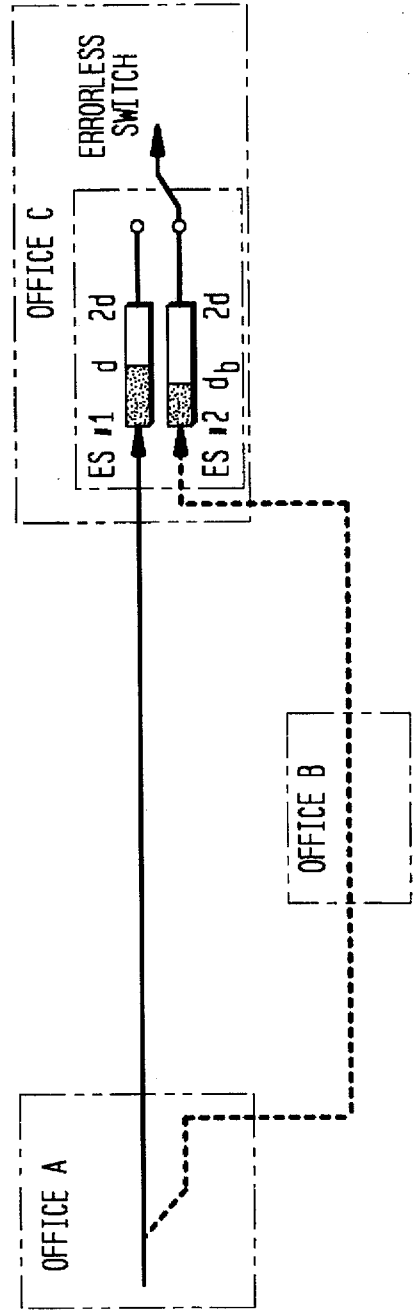
FIG. 2A
FIG. 2B

ERRORLESS SWITCHING TECHNIQUES IN RING NETWORK

TECHNICAL FIELD

This invention relates to errorless switching in ring networks, and more particularly relates to such switching by the use of delays.

BACKGROUND OF THE INVENTION

Traffic carrying capacity of fiber optics medium has been increasing exponentially for almost two decades. The ability to restore traffic from a failure in a network within a very short time has become of paramount importance to service providers and their customers. Highly reliable services are already being offered in an advanced fiber SONET network by a restoration method which reroutes the affected signals to their destinations in case of one or multiple failures in the network to bypass the failure locations within a relatively short period of time. Depending on the type of restoration method used, the restoration time varies from 50 milliseconds (msec) to several minutes.

In addition to accidental failures, there are planned activities in a network which disrupt active services temporarily. Such activities include: civil works on the fiber route, node equipment upgrade on the signal route, and return of a signal from a temporary restoration route to its original route and vice versa.

While it is prohibitively expensive to implement errorless switching capability in case of an accidental network failure, which would require at least three independent and dedicated routes for each signal path, methods of errorless switching of signals in SONET/SDH and ATM networks in case of a planed intrusion have already been proposed and implemented. Assuming that 50% of all intrusions are planned and 50% are accidental, it is possible within the current network architecture to eliminate 75% of all intrusions by rerouting signals in an errorless manner because each intrusion, planned or accidental, is associated with another to return the signals to their original routes.

Errorless switching to prevent any planned intrusion, which comprises the majority of all intrusions, is particularly important to large business customers who use the network for large quantity data transfers. For such customers, the high quality and minimally intrusive services offered by errorless switching are important.

In a SONET Bidirectional Line Switched Ring (BLSR) based network, the efficient utilization of the ring capacity depends on the traffic pattern within the ring. Since the pattern will change as traffic within the ring grows, traffic rearrangement activities within a BLSR will increase significantly. Therefore errorless switching capability is important in the BLSR environment. Although errorless protection switching has been provided in a cross-connect based mesh network, there is no known method of providing errorless protection switching in a ring network, such as BLSR.

In prior errorless switching methods, a signal on a working channel is duplicated at the originating node and both copies of the signal are received at the destination node— one from the working channel and the other from an alternate channel on a physically alternate route. FIG. 1 illustrates the two alternate routes, original route AC and the alternate route ABC, for a circuit between nodes A and C. The associated nodes are equipped with light wave terminals LT and DSC 3/3 cross-connect systems, as well path terminating equipment (PTE). Office A receives data from a 140 million bits per second (Mb/s) circuit DS3, E4.

At the originating node A, the signal is bridged to the alternate route ABC (FIG. 2). At the receiving node C, the cross-connect system which receives both signals is equipped with one elastic store of size 2d for each signal. The value of d is equal to the maximum differential delay between the original route (AC) and any other possible alternate route. A delay equal to d is added to the elastic store on the original signal at the path terminating node C when the signal is established for the first time. Signals simultaneously transmitted over routes AC and ABC are then frame aligned by adjusting the delay in the elastic store on the alternate route ACB. Payload within the frame of the alternate channel is then aligned with that in the working channel to take care of the different pointer values of the two identical Synchronous Payload Envelopes (SPE) within two different SONET/SDH frames. Errorless switching can then be performed to switch the signal from route AC to ABC without a single bit error.

Additional examples of known errorless switching are found in U.S. Pat. Nos. 5,051,979 and 5,285,441.

Although the above-described method works well enough for cross connect based networks, it is inapplicable to ring networks. The present inventions solves the problem of providing errorless switching in ring networks.

SUMMARY OF THE INVENTION

A network suitable for use in connection with the present invention may have one or more rings and includes two or more data transmitting routes. In such a ring network, errorless switching may be achieved by comparing the transmission delays inherent in at least some sections of the two or more routes. One way of making the comparison is by comparing the lengths of the sections. A first delay is added to at least one of the two routes. The value depends at least in part on the results of the comparing of the transmission delays. A second delay is added to at least one of the two routes for enabling alignment of signals transmitted on the routes and errorless switching between the two routes. Switching then occurs between the routes, and at least one of the first and second delays is adjusted for reducing cumulative delays on at least one of the routes.

According to another aspect of the invention, errorless protection switching for a ring-configured link that connects switching nodes can be accomplished by measuring the ring length and the length of a section of the ring which defines a first path between access and egress nodes. A first delay is introduced only when the length of the section of the ring is less than half of the ring length. Before signals are switched from the first path to an alternate path, the signals on the paths are phase aligned.

By using the foregoing techniques, errorless switching may be achieved in a ring network with a degree of accuracy, reliability and speed previously unattainable.

BRIEF DESCRIPTION OF THE DRAWINGS

In the drawings

FIG. 2(a) is block diagram illustrating a prior art method of adding delay to a DCS based network;

FIG. 2(b) is a block diagram illustrating a prior art method of frame aligning two signals transmitted over a DCS based network;

DETAILED DESCRIPTION

Operation Principles of Bi-directional Line Switched Rings (BLSR)

In a network based on point-to-point light wave links and/or connected by cross-connect systems, the switching point is always the end point where the signal is received from both the working and the alternate channels. This is also true in case of a dedicated protection ring (Sub-Network Connection or SNC protection according to ITU-T terminology and path switched ring in ANSI terminology) in which there is a dedicated alternate channel for each working channel. However, high bandwidth SONET/SDH BLSRs (MS Shared Protection Ring or MS-SPRing in ITU-T terminology ) are being used extensively to form high capacity backbone networks. The switching points in these rings are not at the receiving nodes. The basic principles of operation of BLSR (MS-SPRing) are as follows:

(1) Half the capacity in each section of the ring, is used for working traffic and the remaining half is available in case of a failure in any section of the ring and these protection slots are shared by failure in any location of the ring.

(2) When a section fails, a working section is replaced by the concatenated protection section around the other side of the ring.

(3) Since a section is replaced by another section, switching is performed at the adjacent nodes of the failed location regardless of the final destinations of the signals within the ring.

Figure 1:
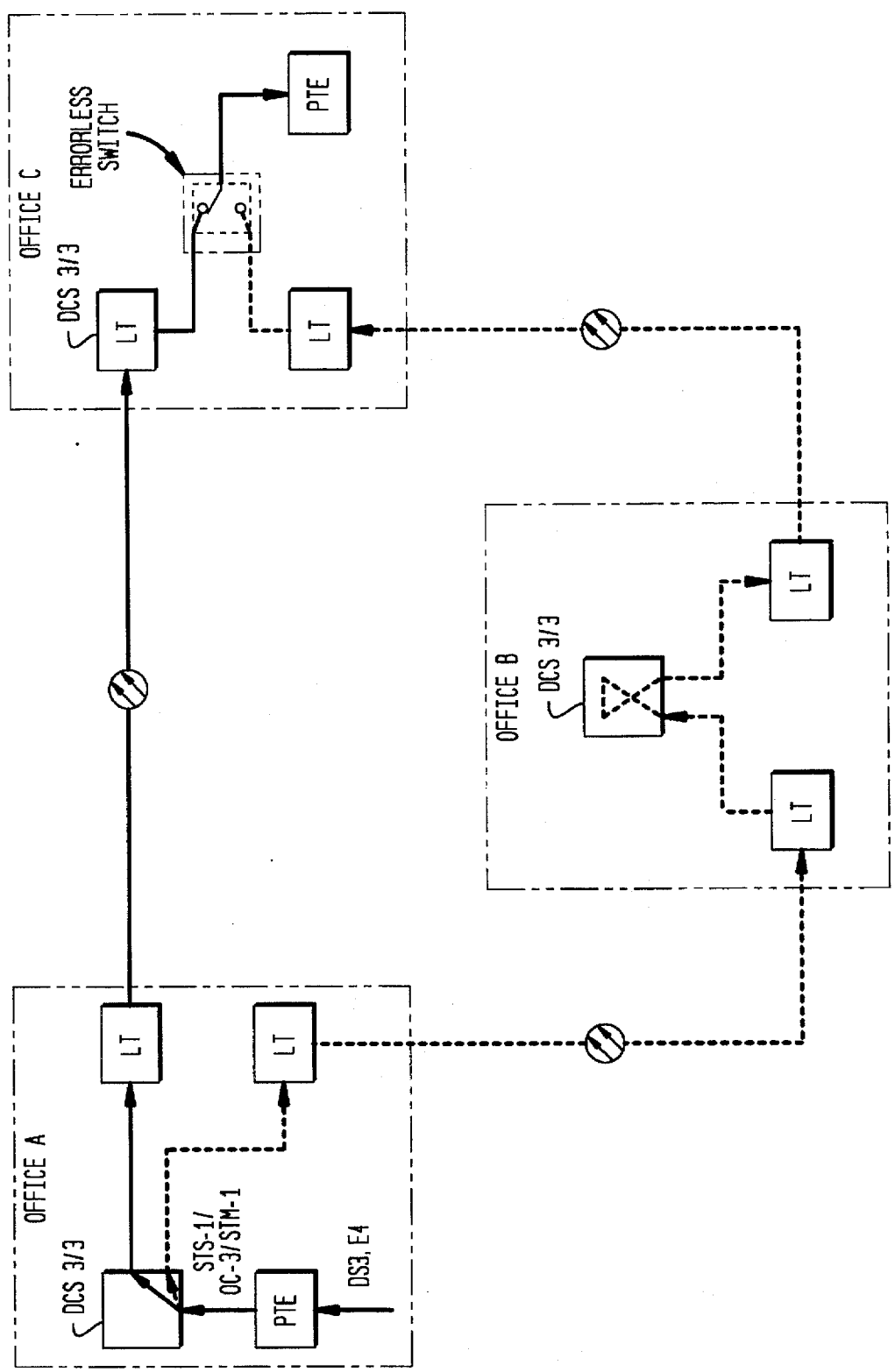
FIG. 1 is a block diagram of a prior art method of errorless switching not suitable for a ring network.
Figure 3:
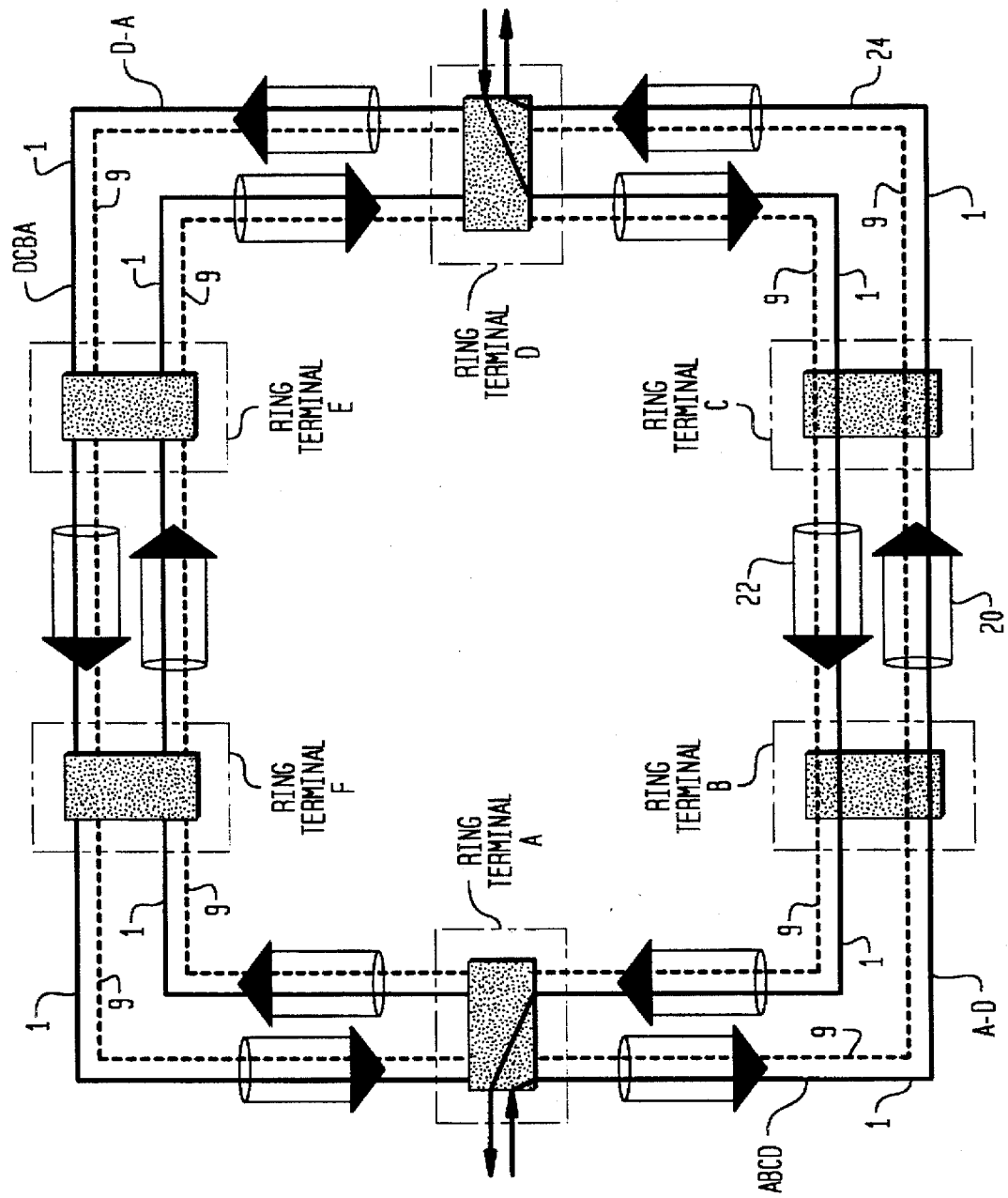
FIG. 3 is a block diagram illustrating a bi-directional line switched ring network suitable for use with the present invention.

Typical operation of a BLSR (or MS-SPRing) is shown in FIG. 3. For illustration purposes, the BLSR includes a OC-48/STM-16 2-fiber ring 20 with errorless switching at the STS-3c level. It should be noted however, that the principles discussed here apply equally to STS-1 signals and also to 4-fiber rings.

Figure 4:
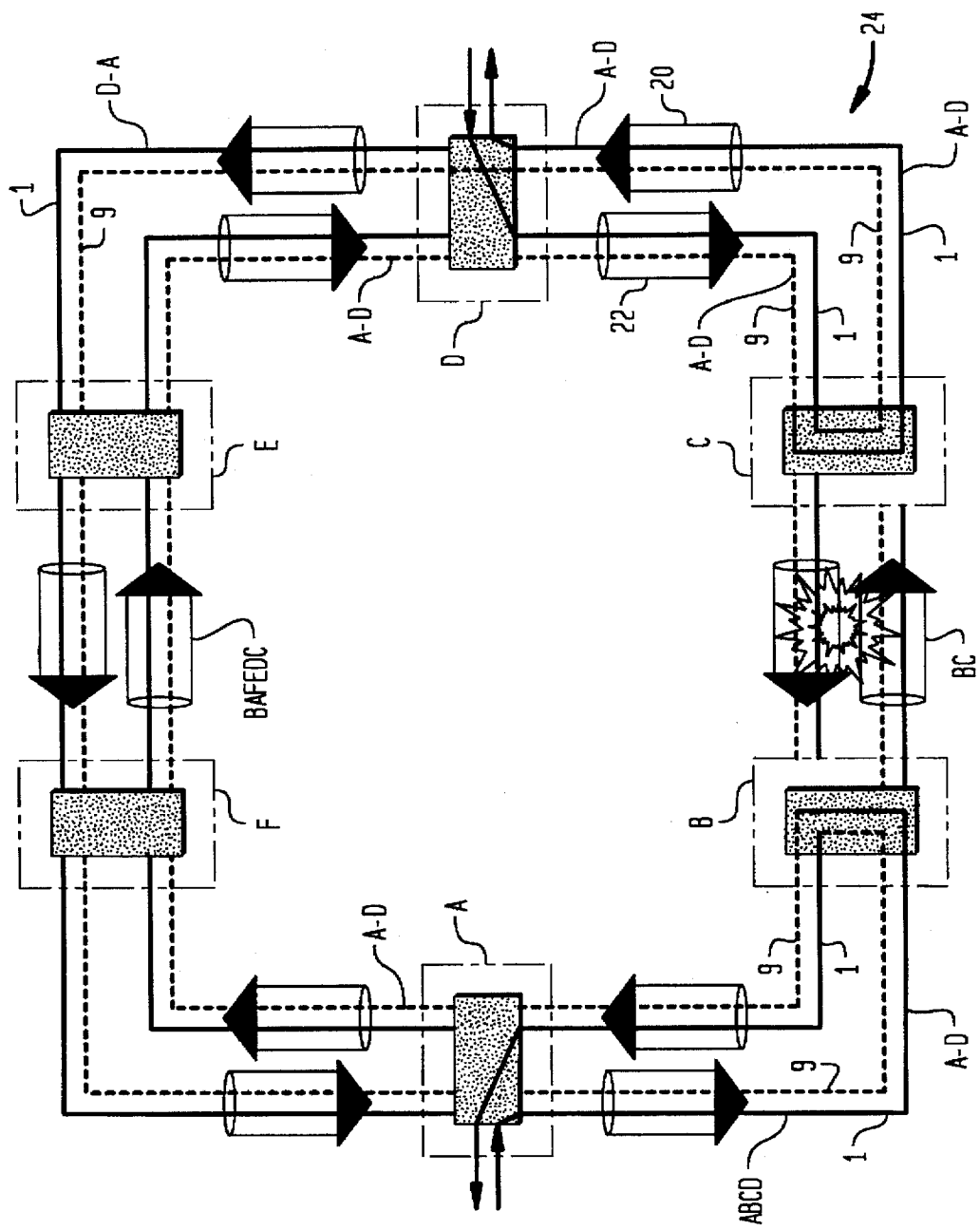
FIG. 4 is a block diagram illustrating one method of protection switching of the network illustrated in FIG. 3 that is suitable for use with the present invention.

There are two fibers 20 and 22 between each pair of adjacent nodes A–F in 2-fiber ring 24. In each fiber, half of the tributary time slots 1–8 (8 STS-3s) (illustrated by the solid line 1) are used for normal traffic and the remaining time slots 9–16 (illustrated by the dotted line 9) normally remain empty. Slots 9–16 are used on a shared basis for any failure within ring 24. A signal A-D between nodes A and D on a route ABCD is established in time slot I of the outer (counterclockwise) fiber 20. Its counter part signal D-A is established on a route DCBA in slot 1 of the inner (clockwise) fiber 22. When there is a failure in a section on route ABCD as shown in FIG. 4 (i.e., section BC), the A-D signal is switched at node B (adjacent to the failure) on to slot 9 of inner fiber 22. Signal A-D arrives at node C in slot 9 of inner fiber 22. Signal A-D is then switched from slot 9 of inner fiber 22 to slot 1 of the outer fiber 24. The original signal route ABCD is thus restored by replacing the failed section BC (channels 1–8) by the concatenated route BAFEDC (channels 9–16).

It should be noted that the ring nodes perform the functions of both light wave terminals and 3/3 cross-connect systems. However, there are two key differences. First, the bridging and switching nodes in a BLSR are not the originating and the receiving nodes as in a DCS based network. Second, the bridging and switching takes place in a BLSR autonomously without any commands from external control system. The communication among the nodes in a BLSR for bridging and switching takes place via the two SONET overhead bytes K1 and K2 using the ring APS (Automatic Protection Switching) protocol.

Errorless Switching in a DCS Network Is Unsuitable for a Ring Network

In a ring network, switching is not performed at the receiving node. Instead, switching takes place at the nodes adjacent to a failed section. Therefore the locations of the switching points for any failed signal are not predetermined. For example, if section BC fails (FIG. 4), then the bridging and switching occurs at nodes B and C, respectively. According to the errorless switching method in a DCS based network, a delay is to be provisioned at the receiving end. However, since the end nodes are not the switching nodes in a BLSR, the delay at the end node cannot be used to align the two signals at an intermediate switching node. Therefore, the errorless switching method used in DCS based network is unsuitable for a BLSR based network. In addition, an errorless switching method suitable for a single ring needs to be modified to extend to a multiple ring situation because the addition of delay in each ring may lead to an unacceptable amount of built-in delay on the signal path.

Errorless Switching in a Single Ring

There are two typical situations in which errorless protection switching can be applied in a ring network:

1) When a signal between two nodes originally established on one side of the ring needs to be rerouted through the other side of the ring (e.g., due to growth in ring traffic); and 2) After a failed section is repaired, and a signal needs to be returned to its original route through the repaired section.

Pre-Planned Rerouting In A Single Ring

Figure 5A:
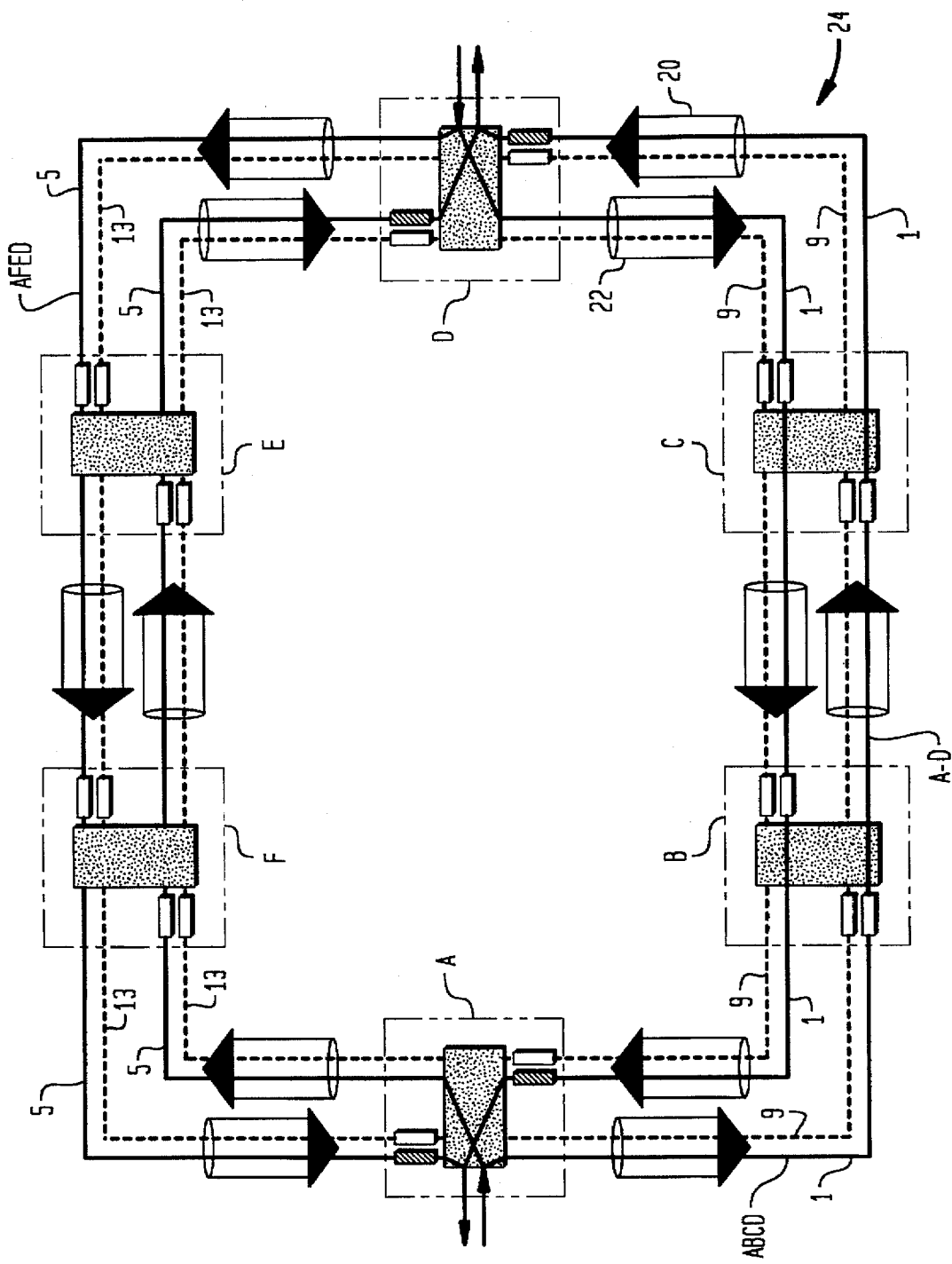
FIG. 5(a) is a block diagram illustrating preplanned rerouting in a single ring network in accordance with one preferred form of the invention.

Preplanned rerouting typically is used when an established signal originating and terminating within a single ring needs to be rerouted through the other direction of the ring. Efficient utilization of the capacity of a BLSR depends on the traffic routing on the ring which in turn depends on the given traffic pattern. As the traffic in a ring grows, the traffic pattern changes. Therefore it is necessary to reroute established signals within a BLSR. As shown in FIG. 5(a), a signal A-D between nodes A and D is established on route ABCD on channel 1. As the traffic pattern changes over the years, it may be necessary to change signal A-D to route AFED. Errorless switching to reroute these signals from one direction of the ring to the other will thus enhance the quality of service significantly in a ring based network.

Figure 5B:
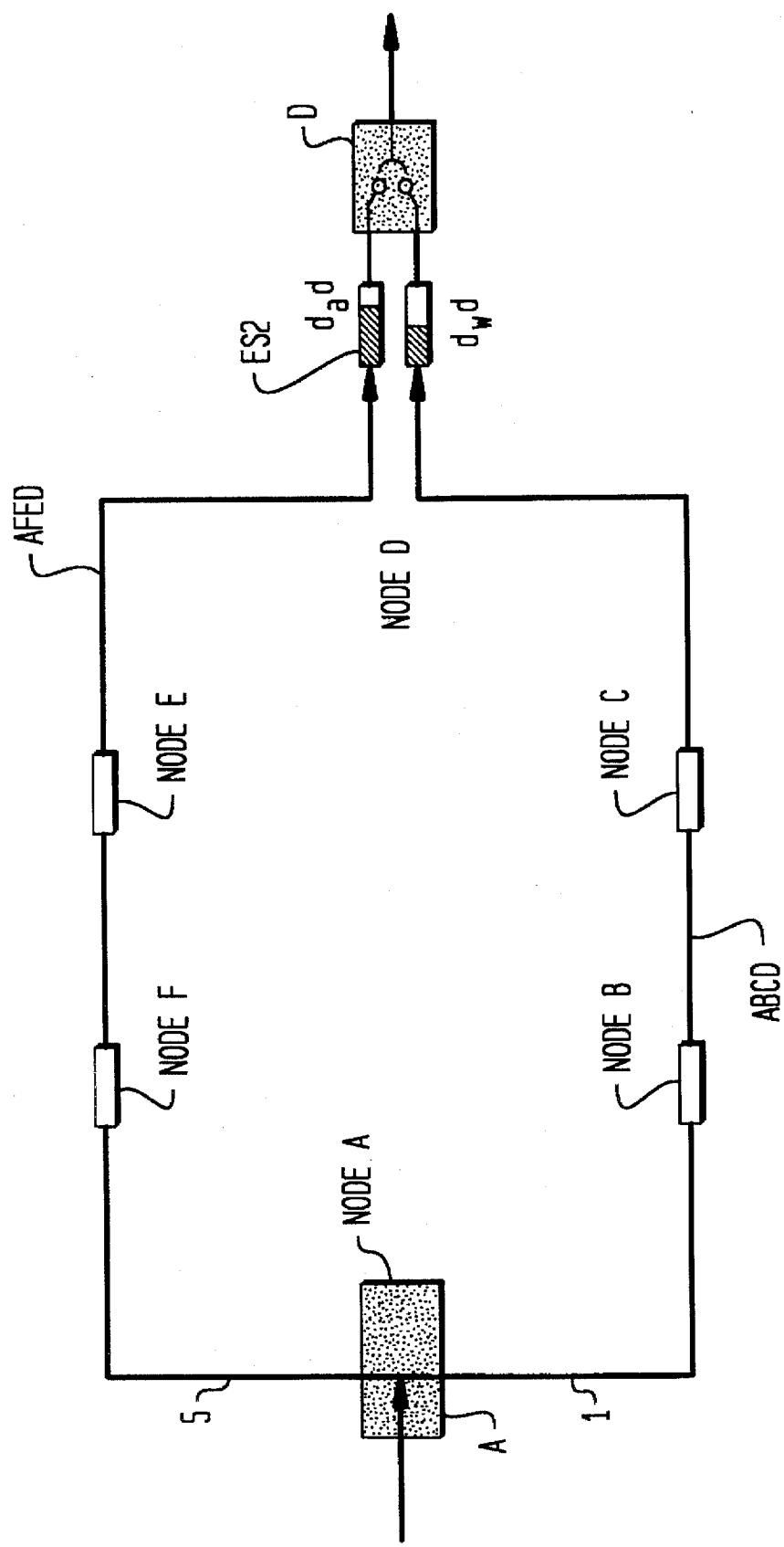
FIG. 5(b) is a block diagram illustrating errorless switching for preplanned rerouting in a single ring network in accordance with one preferred form of the invention.

Since this rerouting is pre-planned, the bridging and switching can be accomplished at the originating and terminating nodes, respectively, provided an elastic store at node D has been provisioned with an appropriate delay when the signal A-D was established. Signal A-D is bridged at node A to an empty channel (e.g., channel 5 in route AFED of fiber 22). Errorless switching from route ABCD to AFED is performed at node D. FIG. 5(b) illustrates the switching configuration in this situation. The provisioned delay $\delta_w$ on the elastic store ES1 at node D on channel 1 of route ABCD guarantees that the alternate path on channel 5 of route AFED is shorter than the original route ABCD. The delay $\delta_w$ must be provisioned when signal A-D is first established. The elastic store size can be calculated from the following two equations:

$$l_a + l_w = l_R \quad (1)$$

$$l_w + \delta_w = l_a + \delta_a \quad (2)$$

Where $l_w$, $l_a$, and $l_R$ are the optical path lengths for a signal on working route ABCD, on alternate route AFED, and the entire ring 24, respectively. A delay $\delta_w$ is added on the working path when signal A-D is established and a delay $\delta_a$ is added on the alternate path to align identical signals transmitted from node A in both directions around the ring. That is, identical signals are simultaneously transmitted over routes ABCD and AFED so that they can be phase aligned at node D.

If the working path is shorter than the alternate path ($l_w \leq l_a$ or $l_w \leq l_R/2$), then a delay $\delta_w = (l_R - 2 l_w)$ is added when signal A-D is established. When signal A-D needs to be routed on the other side of the ring, through route AFED, two identical signals from both sides of the ring, can be aligned at node D with a small delay adjustment ($\delta_a \cong 0$) on the alternate route of the signal (i.e., route AFED) in store ES2. Since the minimum value of $l_w$ can be as small as zero, the size of elastic store ES1 must be equal to $l_R$.

If, on the other hand, the working path ABCD is longer than the alternate path AFED ($l_w \geq l_a$ or $l_w \geq l_R/2$) then the elastic store on the working path should not be provisioned with any delay at all ($\delta_a = 0$). When signal A-D needs to be switched to the alternate route on the other side of the ring AFED, a delay $\delta_a = (2 l_w - l_R)$ needs to be added to on the alternate route AFED to align two identical signals simultaneously transmitted over routes ABCD and AFED. Since the maximum value of $l_w$ can be equal to $l_R$, the size of $l_R$ for elastic store ES2 is sufficient.

Depending on whether the working channel is shorter or longer than the alternate channel, a delay needs to be provisioned during signal set up. Therefore, it is necessary to determine the lengths of the working path, the alternate path, and the entire ring. These measurements can be done by routing a pair of signals between a pair of nodes in both directions around the ring and comparing the arrival time of the signals at the receiving node. From these measured delay differences for every pair of nodes, the lengths of each section can be easily calculated and stored in the database of the ring terminals. Thus, either delay times or route lengths can be used to determine the value of delay added to the elastic stores of the various routes described in this specification and claims. Reference to transmission delay is intended to cover route length and vice versa.

The design of the elastic store size of a ring, terminal will depend on the longest possible ring. For example, if the maximum ring length is 1000 km, the propagation delay around the ring is about 5 msec. Therefore the elastic store size needed for each STS-3c path in a ring terminal is 97.5 Kbytes. The aggregate RAM needed in an OC-48 ring, terminal is 3.12 Mbytes with elastic stores on the receiving path from both sides of the ring as shown in FIG. 5(a).

It is assumed that the delay is added in the elastic store at the receiving node of a signal. However, as discussed in the following, section, when a signal is returned to the original route after a failure, the delay is added at the switching node which is not necessarily the receiving node. The built-in delay at the intermediate node guarantees that the route around the other direction of the ring is shorter and therefore errorless switching can be performed in this situation as well.

Return to Original Path After Ring Restoration

When a signal is restored using the ring switch protocol defined in ANSI and ITU-T (G.841) standards in case of an accidental failure, the restoration (which occurs within 50 msec) is not errorless. However, when the failed section is repaired and the restored signal is returned to its original path, the signal switching can be errorless.

Figure 6A:
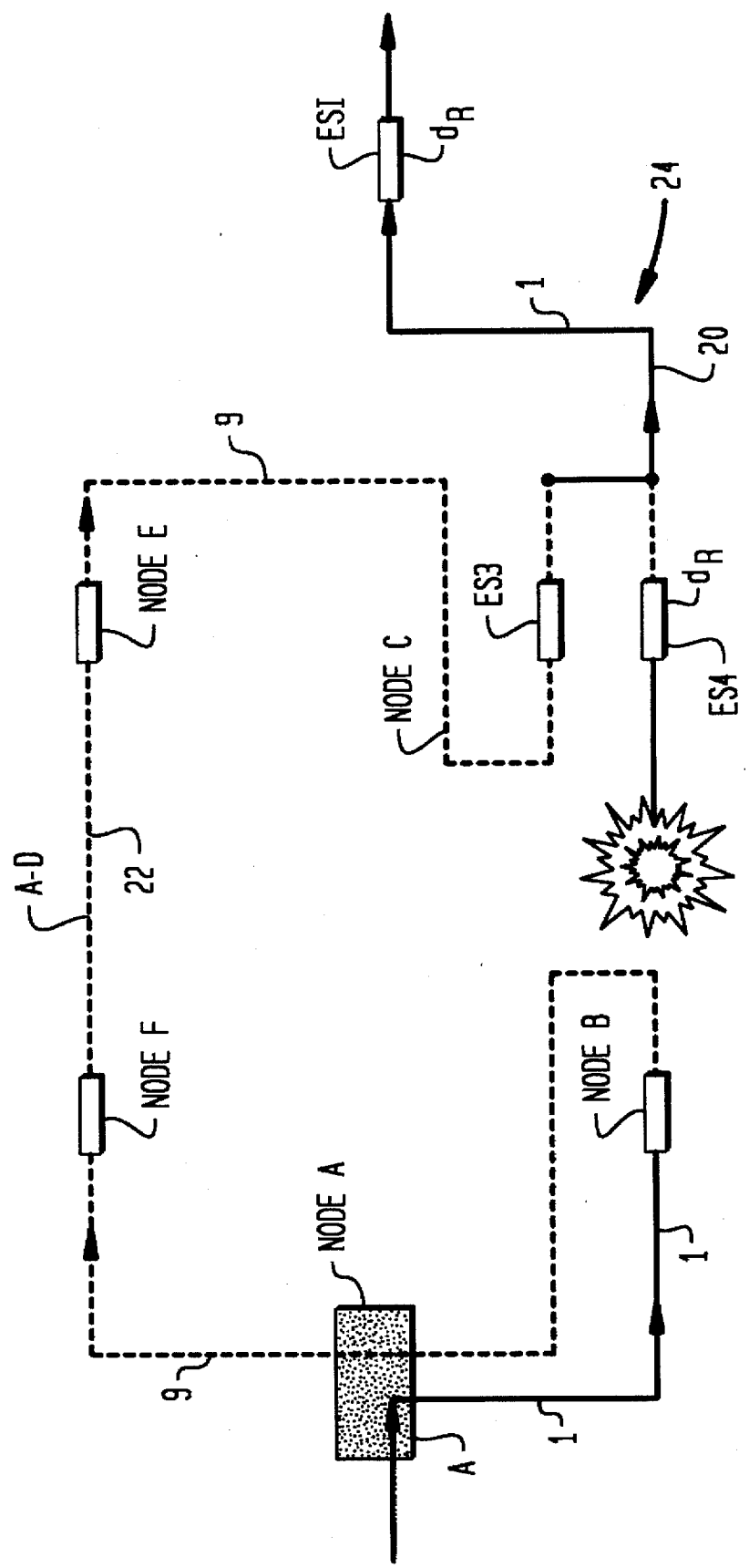
FIG. 6(a) is a block diagram illustrating switching from a first route to a second route after failure of a section of the first route in accordance with one preferred form of the invention.

As shown in FIG. 6(a), when there is a failure in section BC, the signal originally on route ABCD (i.e., signal A-D) takes route ABAFEDCD. Shared protection channel 9 of fiber 22 is used for the BAFEDC part of the protection route.

Figure 6B:
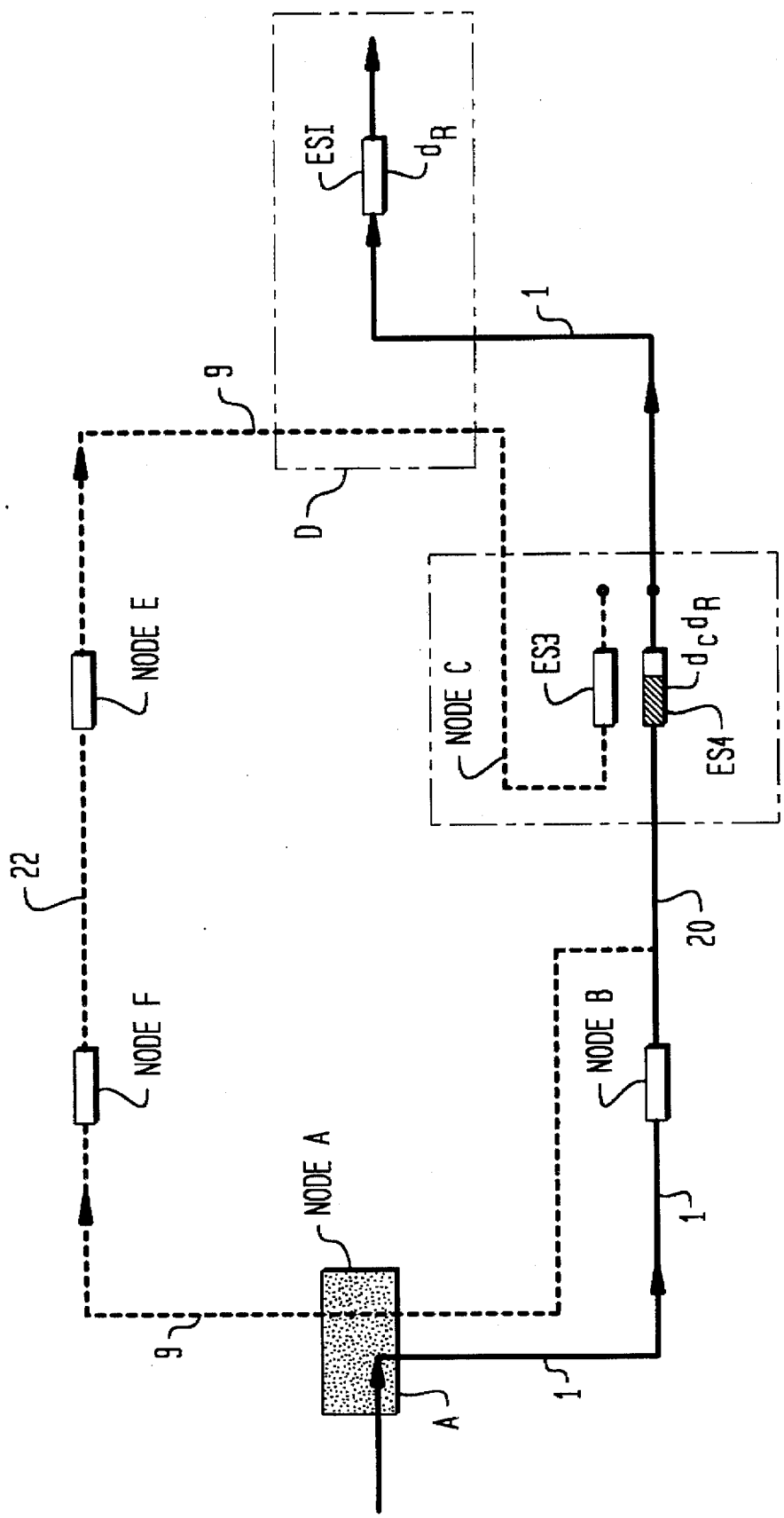
FIG. 6(b) is a block diagram illustrating a return to the first route shown in FIG. 6(a) after the failure has been corrected in accordance with one preferred form of the invention.

When the failed section is repaired, the signal is received at node C also from channel 1 on the original route ABCD of fiber 20. As shown in FIG. 6(b), the elastic store ES4 on channel 1 of route ABCD on fiber 20 at node C is then adjusted with delay $\delta_c$ to align the two copies of the signals at node C provided the protection channel path delay of route ABAFEDC is more than the path delay on channel 1 on the route ABC of fiber 20.

As shown in the previous section, an elastic store size equal to the ring, path length is sufficient to align identical signals routed on both sides of the ring. The elastic store size needed for errorless restoration of a signal after failure will now be described. The path length, $l_{prot}$, of a protection channel when section i fails is given by $$l_{prot} = l_w - l_i + l_i' = l_w + l_R - 2l_i \quad (3)$$

and $$l_i + l_i' = l_R \quad (4)$$

where, $l_w$ is the path length of the signal on the original route (ABCD in FIG. 6(a)), $l_i$ is the path length of the failed section i (BC), and $l_i'$ is the path length of the protection section route ABAFEC.

If there is a restriction that the path length of the longest section in a ring is less than half the ring, length ($l_i < l_R/2$ for all i), then it is evident from Equation (3) that $$l_w < l_{prot} < l_w + l_R \quad (5)$$

Therefore an elastic store size of $\delta = l_R$ on the original signal path is sufficient to guarantee that two identical signals can be aligned at node C with appropriate delay added to the elastic store ES4 on the original path (channel 1, fiber 20) at node C.

If, on the other hand, no restriction is imposed on the possible section length and $l_i \leq l_R/2$, the protection path is shorter than the working path. Since delay cannot be added on the active signal, it is necessary to add a delay equal to $(2 l_i - l_R)$ on the protection path when a signal is switched to that path on failure of the i-th section. To provide errorless switching in this situation as well, the ring nodes must have the link length (multiplex section) information available so that the network can add an appropriate amount of delay on the protection path when there is a failure on an adjacent section. The case of a node failure is equivalent to two adjacent link failures. Therefore, in the case of a node failure, the added delay on the protection path is equal to $(2 l_i + 2 l_{i-1} - l_R)$, where i and i-1 are the adjacent links to the failed node. Therefore, the far end switching node needs to have the information on the section or sections failed for errorless switching without any restriction on the section lengths. This information is available to the switching nodes through the K2 byte of the Section Overheads used in the ring protection switching protocol. That is, the data needed to determine the transmission delay or physical length of each section of a route is stored in and transmitted with the signals being routed. Alternatively, such data can be stored at nodes in the ring network. With the information on which section or sections failed and the corresponding section length is (or transmission delay), the switching node needs to add an appropriate delay before switching and after a failure occurs on the signal path.

If the provisioned delay at an end node (e.g., node D) is not removed and a delay equal to $l_R$ is added at an intermediate node (e.g., the delay added to store ES4 at node C) for errorless switch back, then the total delay on the working route (e.g., route ABCD of fiber 20) will exceed $l_R$. To avoid accumulation of delay, whenever there is a failure on any section of a signal route, delays from all elastic stores on the signal route including the one at the end node should be removed.

Both types of intrusions due to traffic rerouting and return to original route subsequent to the repair of a failure in a single ring can be errorless, provided the ring terminals are equipped with elastic store of size $l_R$ on the path of each tributary at the receiving side as shown in FIG. 5(a) and each node has a database with link length (or transmission delay) information.

Multiple Ring Network

If an end-to-end signal is established on multiple rings and an errorless switching function is incorporated in each ring, the total delay on the signal path is equal to the sum of the path lengths of all rings. The total delay on the signal path in this situation can be large. For example, signal on 5 rings each of length 2000 km would have an effective delay equal to 10,000 km or 50 msec. According to ITU-T Recommendation G.114, the maximum one-way delay permissible for telephone connections is 400 msec. Even though the added delay is still much less than 400 msec., the quality of connections with such a large delay and without echo cancellation is perceived as disturbing.

A general guideline for good quality voice connections is to use an echo canceler on the signal path if the one-way delay is more than 25 msec. Thus, with echo cancellation, the added delay does not significantly affect the signal quality. In high quality networks, echo cancellation is used on every circuit. Moreover, it is not necessary to add delay in every ring, of the signal path.

When a signal fails, delays in elastic stores on the affected signal path are removed to avoid accumulation of delays. If the signal path is confined within a signal ring, the removal of the delays can be accomplished without any intervention from an external control system because of the APS communication channel among the nodes within the ring. However, when a signal is established on multiple rings, there is no channel available to communicate between multiple rings to perform the delay removal within the ring, switching time, 50 msec. Use of a Data Communication Channel (DCC) for this purpose is not fast enough. Accumulation of delay can be avoided by shifting the delay from any intermediate node on the signal path to the end node and vice versa without affecting the signal.

Figure 7:
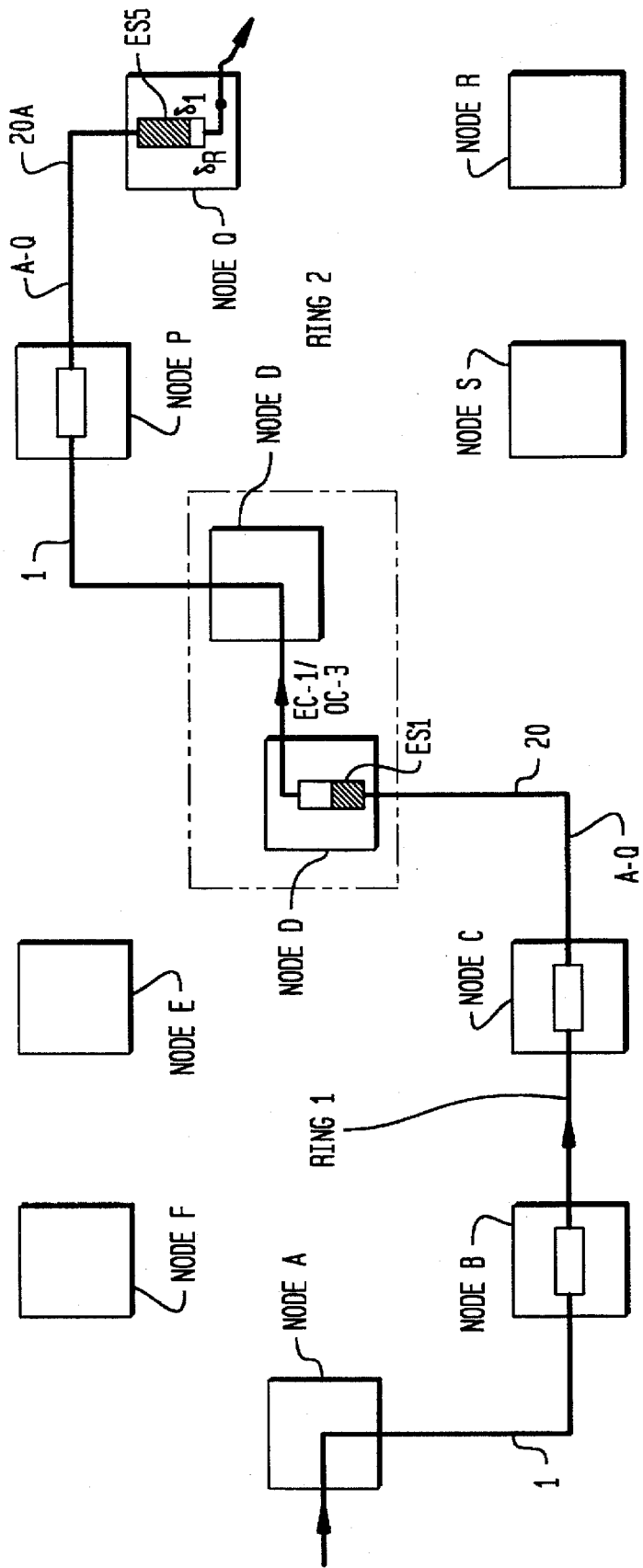
FIG. 7 is a block diagram illustrating a route through a network having two rings.

As shown in FIG. 7, a signal A–Q is established between node A and node Q on Rings 1 and 2 along, route ABCDPQ. Ring 1 includes nodes A–F and ring 2 includes nodes P–S and D. Ring 2 has the same arrangement of fibers as shown in FIG. 3, and the fibers of ring 2 corresponding to the like fibers of ring 1 are shown by a like numeral and the letter A. Thus, fiber 20A of ring 2 corresponds to fiber 20 of ring 1. Errorless rerouting of the signal in any of the rings on its path from one side of the ring to the other would require that the working path length in each ring, be greater than $l_R/2$. Therefore a delay is added at the egress node of a ring if $l_w \leq l_R/2$. No delay is added if the working path length is greater than $l_R/2$. For example, delays can be added to store ES1 on channel 1 of fiber 20 of ring 1 and to store ES5 on channel 1 of fiber 20A of ring 2. Alternatively, store ES1 could be provided with no delay, and store ES5 could be provided with a single delay having a value corresponding to the greater of the individual delays that otherwise would be added to both stores ES1 and ES5. In the event of a failure on channel 1 in ring 1, the delay in store ES5 can be shifted to store ES1 in order to switch a signal from route ABCD to route AFED. The shifting of the delay can be carried out in the manner described in connection with FIGS. 9A and 9B. Errorless rerouting is thus independently provisioned and managed for each ring individually.

Figure 8:
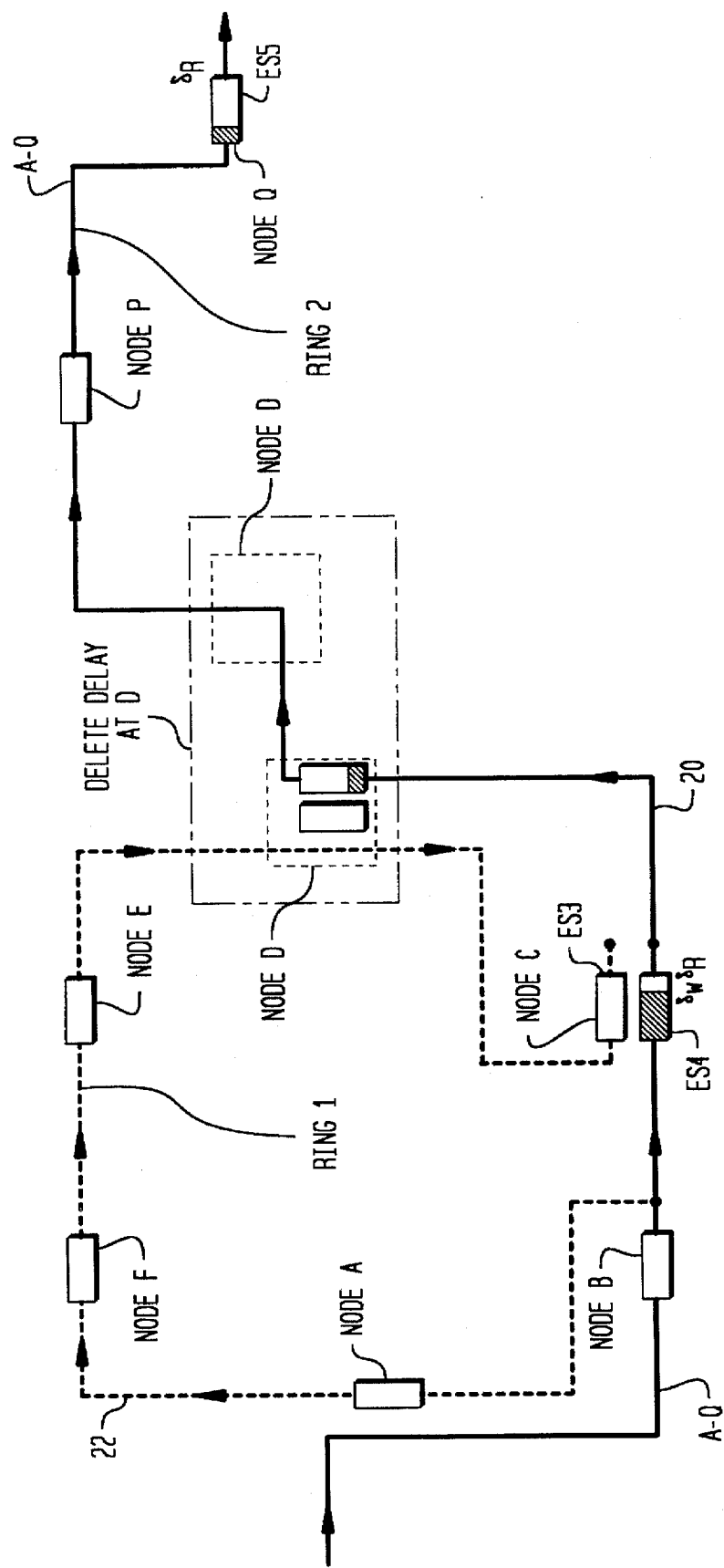
FIG. 8 is a diagrammatic illustration of one preferred form of alignment and errorless switching in the network shown in FIG. 7 in accordance with one preferred form of the invention.

As shown in FIG. 6B, after an errorless switching for restoration to its original path, the elastic store ES4 at the switching node (node C) retains a delay $\delta_c$. The maximum added delay can be equal to $l_R$ in the worst case scenario. This delay is cumulative. For example, after errorless restoration from a failure at Section BC in Ring 1 of the type described in connection with FIG. 6B, a delay $\delta_w$ is added to store ES4 at node C (FIG. 8). If there is another failure in Section DP in ring 2, then errorless restoration may require additional delay added at node P. If during the second failure in ring 2, the delay at node C is not removed, the total delay will accumulate. This delay cannot be removed within 50 msec because it will require inter-ring communication and control. However, it can be shifted from the switching node (node C) of ring 1 to the elastic store ES5 on the egress node (node Q) of ring 2 without error. When a delay is shifted from any intermediate node to an end node, a failure anywhere on the signal route will be detected at the end node, and the shifted delay can be removed on failure detection.

If there is a failure in section BC, delays, if any, at nodes D and Q on the route serving signal A–Q are removed and signal A-Q is rerouted to fiber 22 and then restored to fiber 20 as described in connection with FIGS. 6A and 6B. During the restoration to fiber 20, stores ES1 and ES5 are again provided with their original delays, if any. As shown in FIG. 8, there is a delay w added to elastic store ES4 at node C when it is restored from a failure in section BC. This delay needs to be shifted to store ES5 at the end node Q of ring 2 with errorless switching.

Figure 9A:
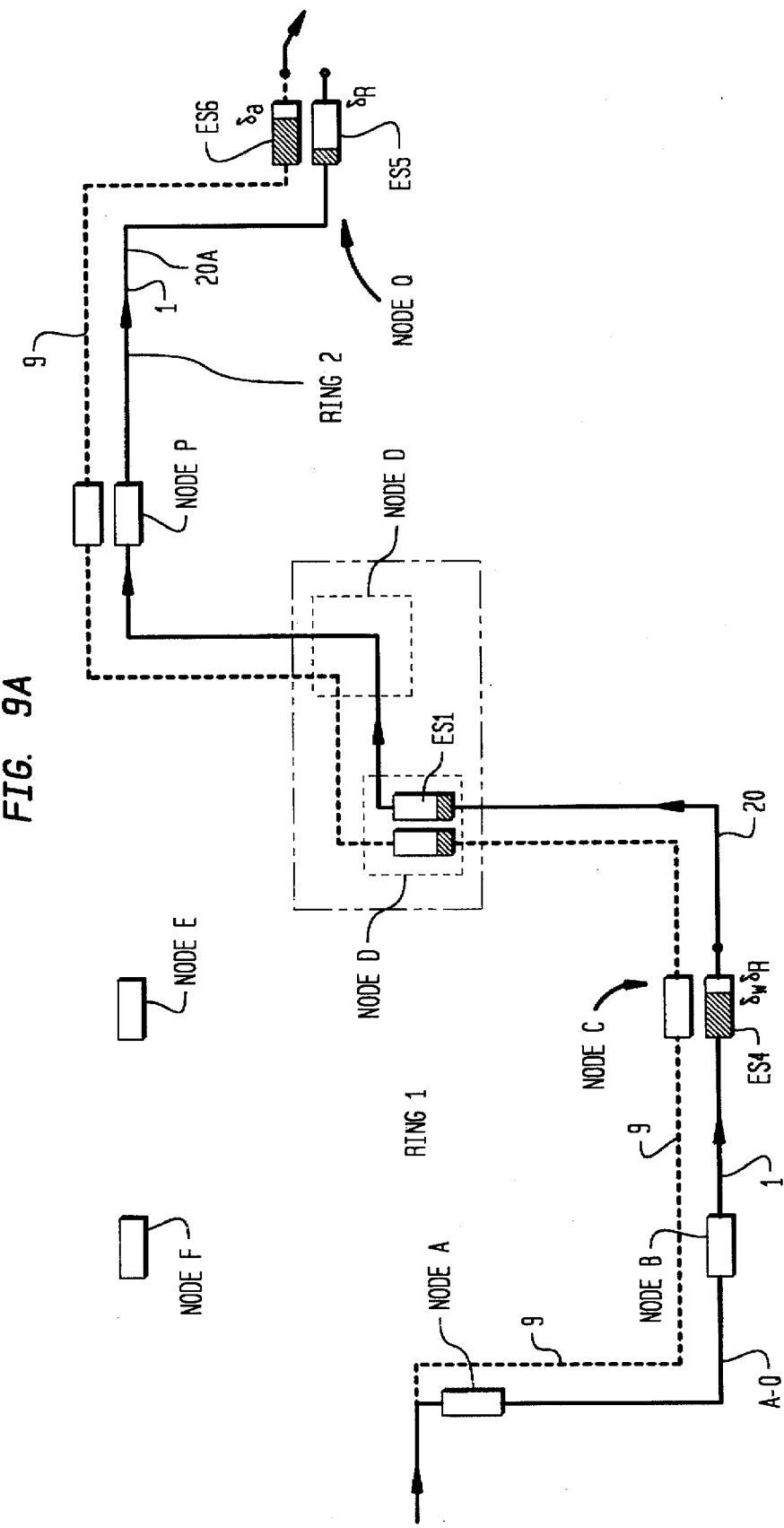
FIG. 9(a) is a diagrammatic illustration of a preferred form of certain preliminary steps by which delay can be shifted to an end node of the second ring of the network shown in FIG. 7.
Figure 9B:
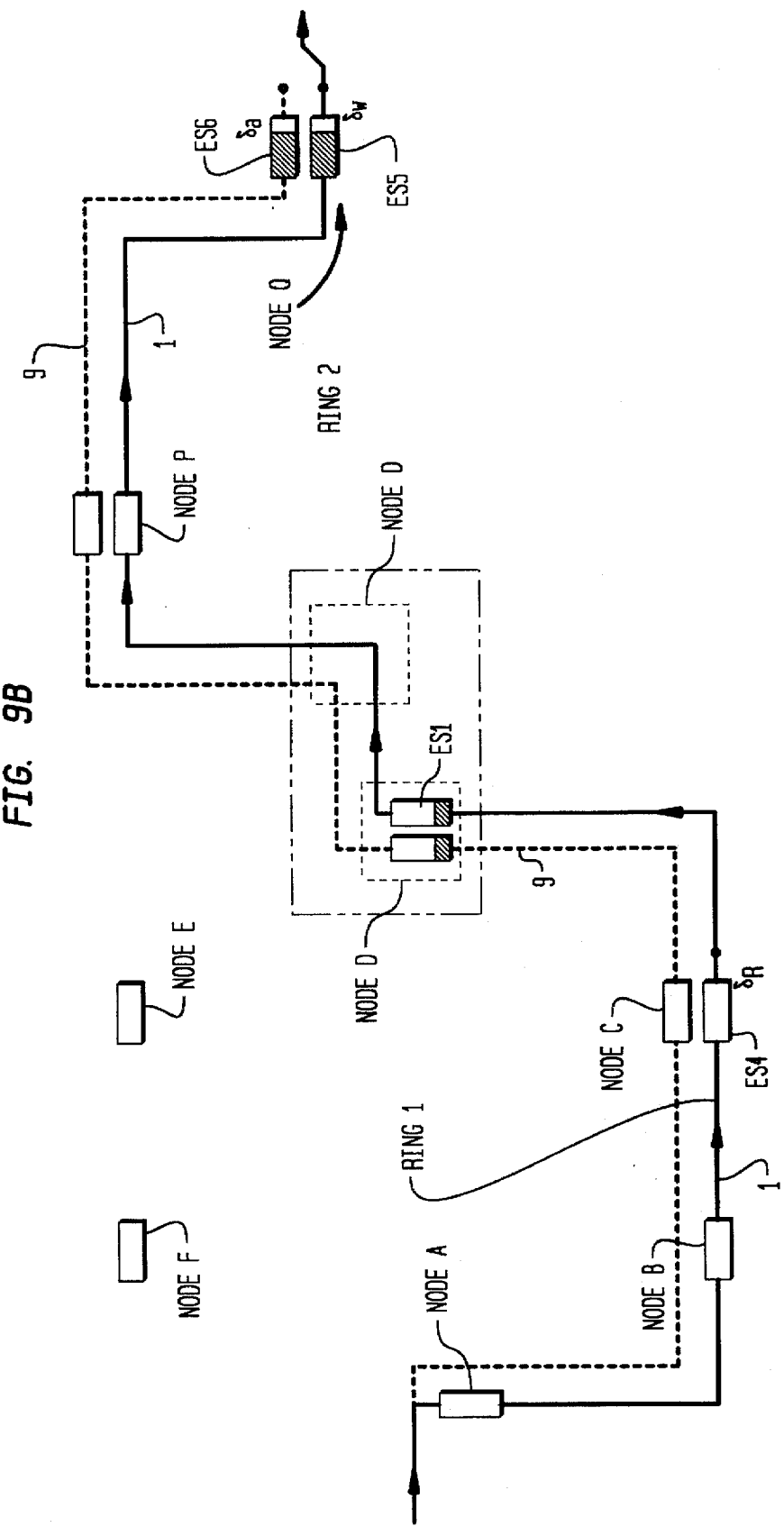
FIG. 9(b) is a diagrammatic illustration of a preferred form of additional steps by which the delay shift started in FIG. 9(a) can be completed.

Referring to FIG. 9A, to shift the delay at node C to node Q, signal A-Q is bridged at originating, node A onto protection channel 9 of fibers 20 and 20A. If a protection access feature is available with the Add/Drop Multiplexers (DAM) serving the network (not shown), then the bridged signal A-Q on channel 9 can be transmitted through Ring 2 as shown in FIG. 9(a). If protection access is not available, then any other empty service channel can be used. The bridged signal A-Q is then received at end node Q. At the same time signal A-Q is being transmitted over channel 9, another identical signal is transmitted from node A to node Q over channel 1 of fibers 20 and 20A. Then the two signals are aligned at end node Q with appropriate delay added to the elastic store ES6 on the bridged signal in channel 9. Then errorless switching is performed to move the signal from the original route on channel 1 to the bridged route on channel 9. Subsequently, the delay w at node C on the working route on channel 1 (in store ES4) is removed, and the delays at the egress nodes (i.e., nodes D and Q) of each ring, are left unchanged. Then the two identical signals being transmitted over channels 1 and 9 are aligned again at node Q with appropriate delay added on elastic store ES5 at node Q on the working channel 1 and switched without error from the bridged route on channel 9 to the original route on channel I as shown in FIG. 9B. The delay at the intermediate node C is thus shifted from node C to the end node Q with errorless switching. This delay in store ES5 can be removed during the next failure in any of the rings on the path of the signal. The shifting, of the delay to the end node thus eliminates delay accumulation.

Shifting the delay from an intermediate node on the signal path to the end node involves several steps and needs coordination among the ADM terminals within the rings. The coordination function between the ADMs in different rings requires a centralized Network Management System controlling all the rings on the signal path or there must be a control and communication link between the separate network management systems for different rings. Otherwise, manual coordination among, several rings would be extremely complicated and error prone. Providing such a Network Management System is within the skill of the art in SONET networks. In addition, since the elastic store size for each ring is equal to the ring length, the ADMs should be designed such that the elastic store size is equal to the length of the longest possible ring that may be deployed in the entire network.

Figure 10:
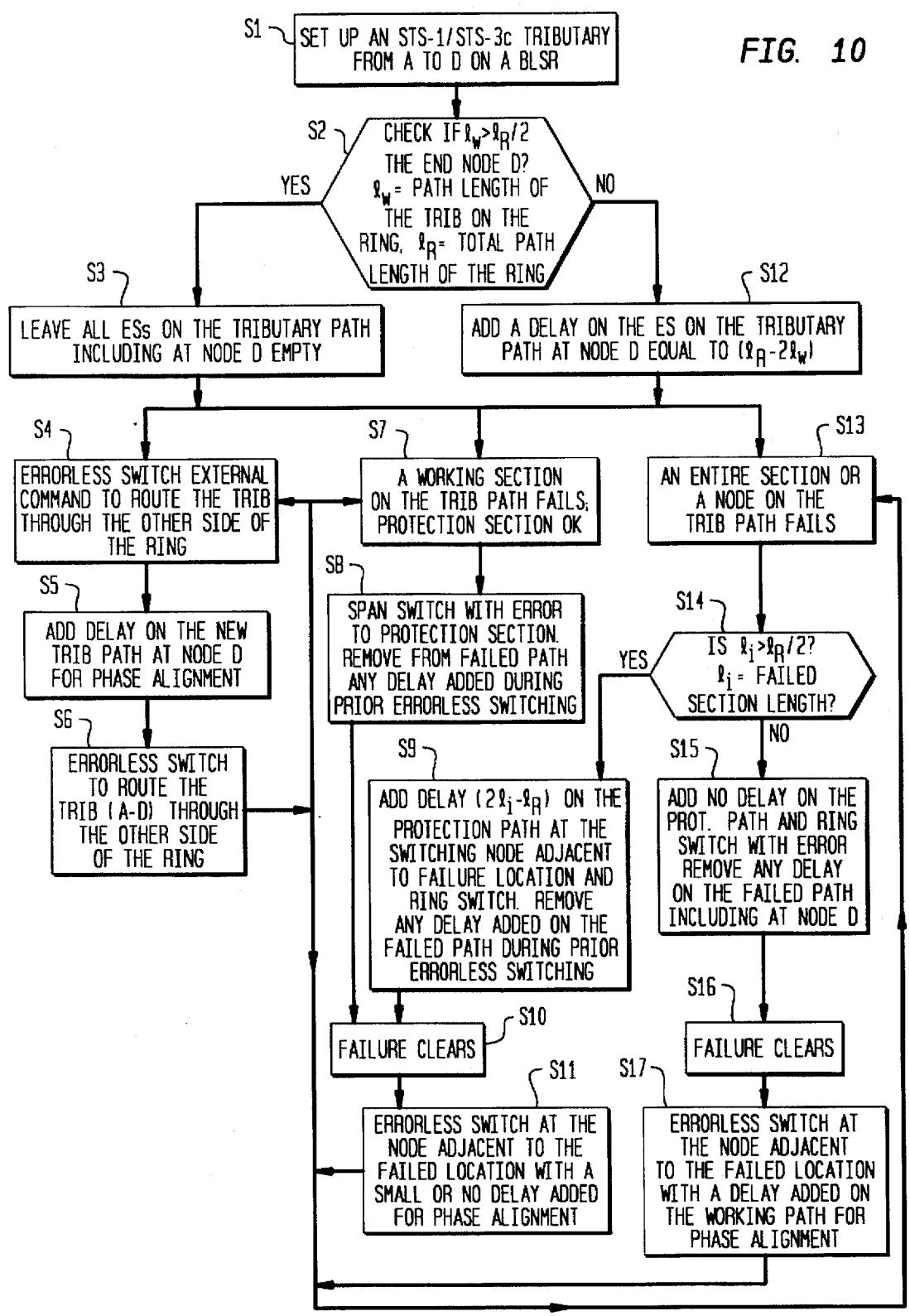
FIG. 10 is a flowchart illustrating a preferred form of errorless switching in a single ring network in accordance with one preferred form of the invention.

FIG. 10 illustrates a preferred method of providing errorless switching in a single ring network of the type shown in FIG. 3. In step S11, a route is set up from node A to node D. In step S2, the transmission delays or lengths of various sections of the routes in the ring, are compared. Whether delay is added or not at node D depends on this comparison. In step S3, no delay is added at node D. This is an important feature which reduces cumulative delays that can decrease the quality of data transmission. If delay is required, it is added at step S12.

In step S4, a decision is made to switch from route ABCD to route AFED. At step S5, a delay is added (e.g., to store ES2 (FIG. 5B)) for phase alignment. At step S6, errorless switching is accomplished (e.g., by switching from route ABCD to AFED (FIG. 5B)). This is an important feature that provides errorless switching for preplanned rerouting, such as when traffic on an initial route requires switching to an alternate route. At the end of step S6, any delay added at node D is the original route (e.g., route ABCD) is removed.

Step S7 describes a type of route section failure in which only some of the channels of a fiber are disrupted. Referring to FIG. 3, such a failure might occur if channel 1 of route ABCD is disrupted, while channel 9 of that route remains operative. An example of the switching described by step S8 is the switching from channel 1 to channel 9 on route ABCD on fiber 20. After switching, delay is removed from channel 1, including the delay, if any, at node D. In steps S10 and S11, after the failure on channel 1 has cleared, assuming the failure was in section BC, a small delay may be added to store ES4 on channel 1 to align the signal on channel 1 with the signal on channel 9.

In step S14, transmission delays of the appropriate sections of a route are compared to determine the delay, if any, to be added. In step S9, delay is added (e.g., to store ES3 (FIG. 6A)) to achieve errorless switching. Delay previously added to the failed route (e.g., route ABCD), such as the delay, if any, added to node D, is removed. In step S15, no delay is added, and delay is removed from the failed path, including node D. In steps S16 and S17, after the failure is corrected, errorless switching is accomplished after a phase alignment delay is added. An example of step S17 is the delay added to store ES4 described in connection with FIG. 6B.

Figure 11:
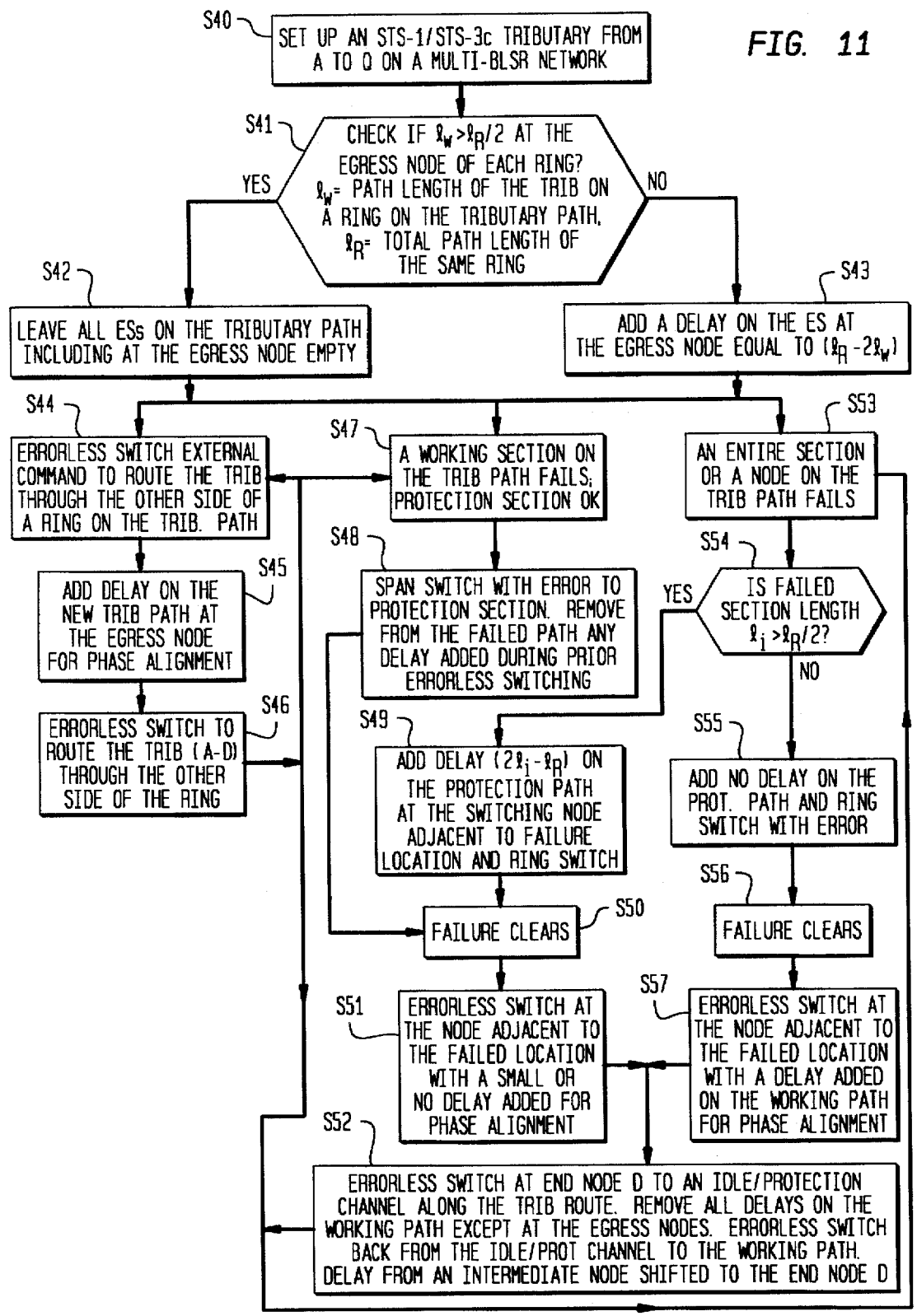
FIG. 11 is a flowchart illustrating a preferred form of errorless switching in a two ring network in accordance with one preferred form of the invention.

Referring to FIG. 11, in step S40, a route is set up from node A of ring 1 to node Q of ring 2 (FIG. 8). In step S41 the transmission delays or lengths of various sections of the routes in rings 1 and 2 are compared. Whether delay is added or not at node D or node Q depends on this comparison. This is an important feature which reduces cumulative delays that can decrease the quality of data transmission. If delay is required, it is added at step S43 either to node Q alone or to nodes D and Q. Steps S44-S46 can be understood from the description of steps S4-S6 of FIG. 10. After step S46, any delay added initially at the egress nodes of a working path are deleted.

Step S47 describes the same type of failure as step S7 of FIG. 10. An example of step S48 is the switching of a route from channel 1 to channel 9 as shown in FIG. 9A due to a failure in section BC of channel 1. In steps S50 and S51 after the failure on channel 1 is corrected,. the working route is switched back to channel I after a phase alignment delay is added to store ES4 on channel 1 (FIG. 8). In step S52, the delay added to store ES4 is shifted to node D in a manner similar to the shifting of delay to node Q described in connection with FIGS. 9A and 9B.

Step S53 refers to a failure of the type shown in FIG. 4 in section BC. In step S54, transmission delays of the appropriate sections of a route are compared to determine the delay, if any, to be added. In step S49, delay is added on the protection path (e.g., store ES3, FIG. 8). At the end of step S49, any delay added on a failed path during prior errorless switching is removed, including any delay added at node D. In step S55, no delay is added to the protection path in order to minimize cumulative delays. At the end of step S55, any delay on a failed path is removed, including delay at node D. In steps S56 and S57, after the failure of the working route is corrected, errorless switching is achieved by adding a phase alignment delay (e.g., the delay added to store ES4, FIG. 6B). In step S52, the delay added in step S57 is shifted to node Q as described in connection with FIGS. 9A and 9B.

Those skilled in the art will recognize that the preferred embodiments may be altered without departing from the spirit and scope of the invention as defined in the claims.

The invention claimed is:

1. A method of performing errorless switching in a ring network comprising one or more rings and comprising a data transmitting medium exhibiting a transmission delay, said network defining a plurality of data transmitting routes along said transmitting medium including a first route and a second route, said method comprising in combination the steps of comparing the transmission delays of at least predetermined sections said first and second routes;

adding a predetermined first delay to at least one of said first and second routes, the value of said first delay depending at least in part on the results of said comparing;

adding a predetermined second delay to at least one of said first and second routes for enabling alignment of signals transmitted on said first and second routes and errorless switching between said first and second routes;

switching between said first and second routes; and adjusting at least one of said first and second delays for reducing cumulative delays on at least one of said first and second routes.

2. A method as claimed in claim 1, wherein said value of said first delay is substantially zero in the event that said transmission delay along the one of said first and second routes to which said first delay is added is greater than said transmission delay along the other of said first and second routes.

3. A method, as claimed in claim 1, wherein said value of said second delay is substantially zero in the event that said transmission delay along the one of said first and second routes to which said second delay is added is greater than said transmission delay along the other of said first and second routes.

4. A method, as claimed in claim 1, wherein said value of said first delay is substantially equal to two times the delay along one of said sections minus the delay along said ring network as a whole.

5. A method, as claimed in claim 1, wherein said step of comparing comprises the steps of:

storing, data from which the lengths of said sections of said first and second routes can be derived; and comparing said lengths.

6. A method, as claimed in claim 5, wherein said step of storing data comprises the step of transmitting said data with said signals.

7. A method, as claimed in claim 1, wherein said step of adjusting at least one of said first and second delays comprises the step of deleting one of said first and second delays.

8. A method, as claimed in claim 1, wherein said step of adjusting at least one of said first and second delays comprises the step of shifting at least one of said first and second delays.

9. A method, as claimed in claim 1, wherein said network comprises a first ring, and a second ring, wherein said step of adding said first delay occurs in said first ring and wherein said step of adjusting at least one of said first and second delays comprises the step of shifting at least one of said first and second delays to said second ring.

10. A method, as claimed in claim 1, wherein said network comprises a first ring, and a second ring, wherein said step of adding said first delay occurs in said second ring, wherein said step of adding a predetermined second delay comprises the step of adding a predetermined second delay to said first ring and wherein said step of adjusting at least one of said first and second delays comprises the step of deleting at least second delay from said first ring.

11. A method, as claimed in claim 1, wherein said step of adjusting at least one of said first and second delays further comprises the step of adding a third delay to said second route in said second ring.

12. A method of performing errorless protection switching for a ring-configured, high speed link that connects a plurality of switching nodes comprised of an access node and an egress node, the method comprising the steps of:

measuring the ring length and the length of a section of the ring which defines a first path for propagation of traffic signals between the access and egress nodes;

introducing a first delay in the propagation of said traffic signals only when the length of the section of the ring is less than half of the ring length; and in response to a need for an alternate path to connect the access and egress nodes, introducing a second delay in transmission of traffic signals traversing the alternate path such that traffic signals on the first path and on the alternate path are phase-aligned.

13. The method of claim 12 wherein said first delay is introduced at the egress node.

14. The method of claim 12, further comprising the step of:

in response to a failure of said first path in the propagation of said traffic signals, setting the second delay for the alternate path to be equal to twice the length of the first path minus the length of the ring.

15. The method of claims 13 and 14 further comprising the step of:

removing, the first delay at the egress node before setting the second delay.

16. The method of claim 12 wherein said second delay is set to near zero when the length of the section of the ring is greater than half of the ring length.

* * * * *